US012784238B2

(12) United States Patent
Stout et al.

(10) Patent No.: US 12,784,238 B2
(45) Date of Patent: Nov. 3, 2026

(54) TRACKING OBJECTS ACROSS IMAGES

(71) Applicant: webAI, Inc., Austin, TX (US)

(72) Inventors: David Stout, Byron Center, MI (US); Ethan Baird, Wyoming, MI (US)

(73) Assignee: webAI, Inc., Austin, TX (US)

( * ) Notice: Subject to any disclaimer, the term of this patent is extended or adjusted under 35 U.S.C. 154(b) by 237 days.

(21) Appl. No.: 18/285,404

(22) PCT Filed: Apr. 5, 2022

(86) PCT No.: PCT/US2022/023480

§ 371 (c)(1), (2) Date: Oct. 3, 2023

(87) PCT Pub. No.: WO2022/216708

PCT Pub. Date: Oct. 13, 2022

(65) Prior Publication Data

US 2024/0185435 A1 Jun. 6, 2024

Related U.S. Application Data

(60) Provisional application No. 63/173,265, filed on Apr. 9, 2021.

(51) Int. Cl.
*G06T 7/246* (2017.01)
*G06V 20/40* (2022.01)

(52) U.S. Cl.
CPC .............. *G06T 7/248* (2017.01); *G06V 20/44* (2022.01); *G06T 2207/10016* (2013.01); *G06T 2207/30241* (2013.01)

(58) Field of Classification Search
CPC ........... G06T 7/248; G06T 2207/10016; G06T 2207/30241; G06T 7/292;
(Continued)

(56) References Cited

U.S. PATENT DOCUMENTS 11,488,374 B1 * 11/2022 Sun .......................... G06T 7/20
2016/0110772 A1 4/2016 Herring et al.
(Continued)

FOREIGN PATENT DOCUMENTS

KR 10-2021-0027778 A 3/2021

OTHER PUBLICATIONS

European Communication dated Feb. 6, 2025, Application No. 22785298.5.
(Continued)

*Primary Examiner* — Jennifer Mehmood
*Assistant Examiner* — Vaisali Rao Koppolu
(74) *Attorney, Agent, or Firm* — Young Law Firm, P.C.

(57) ABSTRACT

A system includes a processor and a memory storing instructions which when executed by the processor configure the processor to receive a plurality of images captured by a camera from an image processing system, detect an object in an image from the plurality of images using a model, and identify the detected object using the model and a database of previously identified objects. The instructions configure the processor to track movement of the identified object across a series of images from the plurality of images. The instructions configure the processor to detect, based on the plurality of images, when the identified object disappears from view of the camera. The instructions configure the processor to determine an outcome for the identified object based on first and last detections of the identified object and a direction of movement of the identified object.

11 Claims, 7 Drawing Sheets

(58) Field of Classification Search
CPC . G06T 2207/30232; G06T 2207/30242; G06T 7/246; G06V 20/44; G06V 10/25; G06V 10/62; G06V 20/00
See application file for complete search history.

(56) References Cited

U.S. PATENT DOCUMENTS

| | | | | |
|---|---|---|---|---|
| 2017/0148174 | A1* | 5/2017 | Kim | H04N 23/90 |
| 2018/0101732 | A1* | 4/2018 | Uchiyama | G06T 7/292 |
| 2018/0342071 | A1 | 11/2018 | Kabushiki | |
| 2019/0019016 | A1* | 1/2019 | Ikeda | H04N 23/611 |
| 2019/0050629 | A1* | 2/2019 | Olgiati | G06T 7/20 |
| 2019/0378205 | A1* | 12/2019 | Glaser | G06Q 30/0643 |
| 2020/0082549 | A1* | 3/2020 | Dehghan | G06V 40/172 |
| 2020/0234057 | A1 | 7/2020 | Koo et al. | |
| 2021/0035327 | A1* | 2/2021 | Magai | G06T 7/90 |
| 2021/0042530 | A1* | 2/2021 | Kim | G06V 20/46 |
| 2021/0144340 | A1* | 5/2021 | Oami | G06T 7/292 |
| 2021/0409655 | A1* | 12/2021 | Kerst | G06T 7/593 |
| 2022/0004761 | A1* | 1/2022 | Biancale | G06V 20/00 |
| 2022/0004775 | A1* | 1/2022 | Flick | G06V 40/20 |

OTHER PUBLICATIONS

Search Report dated Jul. 15, 2022, Application No. PCT/US2022/023480.

Chinese Notification of First Office Action dated Jan. 26, 2024, Application No. 201980081100.2.

Wei Qu et al: Decentralized Multiple Camera Multiple Object Tracking, Proceedings/2006 IEEE International Conference of Multimedia and Expo, ICME 2006: Jul. 9-12, 2006, Hilton Toronto, Toronto, Ontario, Canada, IEEE Service Center, Piscataway, NJ, Jul. 9, 2006, pp. 245-248, XPO32964725.

European Extended Search Report dated Apr. 16, 2025, Application No. 22785298.5.

Office Action dated Jan. 5, 2026 in Indian patent appiication 202317075477 (7 pages).

* cited by examiner

TRACKING OBJECTS ACROSS IMAGES

CROSS-REFERENCE TO RELATED APPLICATIONS

This application claims the benefit of U.S. Provisional Application No. 63/173,265, filed on Apr. 9, 2021. The entire disclosures of the applications referenced above are incorporated herein by reference.

FIELD

The present disclosure relates generally to detecting objects in images and more particularly to tracking movement of objects across the images.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various techniques are used to capture images of objects. For example, in the field of medicine, ultrasound, magnetic resonance imaging (MRI), computed tomography (CT) scan, and other techniques are used to capture images of organs. Surgical procedures are monitored, and images are captured using cameras. In retail applications, inventory depletion and replenishment can be monitored using cameras that capture images of items stocked on store shelves or in warehouses. In automotive industry, cameras mounted on or in vehicles capture images of objects around the vehicles. In security systems, cameras monitor areas in and around buildings and record images. In astronomical and space related applications, cameras capture images of celestial objects. In hazardous applications, cameras monitor and capture images of processes that include hazardous materials and/or operations. In robotics, robots operate based on images captured by cameras, and so on.

SUMMARY

A system comprising a processor and a memory storing instructions which when executed by the processor configure the processor to receive a plurality of images captured by a camera from an image processing system, detect an object in an image from the plurality of images using a model, and identify the detected object using the model and a database of previously identified objects. The instructions configure the processor to track movement of the identified object across a series of images from the plurality of images. The instructions configure the processor to detect, based on the plurality of images, when the identified object disappears from view of the camera. The instructions configure the processor to determine an outcome for the identified object based on first and last detections of the identified object and a direction of movement of the identified object.

In another feature, determining the outcome includes determining that the identified object remains in an area being observed or that the identified object has moved out the area being observed.

In other features, the instructions configure the processor to, for each instance of detection of the identified object, assign a timestamp to the detection of the identified object, assign a label to the identified object, and assign bounding box coordinates for the identified object. The instructions configure the processor to, for each instance of detection of the identified object, store the timestamp, the label, and the bounding box coordinates in a detection history for the identified object. The instructions configure the processor to determine, based on the detection history for the identified object, the first and last detections of the identified object and the direction of movement of the identified object.

In other features, the instructions configure the processor to, for each instance of detection of the identified object, assign a confidence score for the label, and increase the confidence score with each successive detection of the identified object.

In another feature, the instructions configure the processor to predict subsequent detections of the object in the direction of movement with increased confidence.

In other features, the instructions configure the processor to detect the identified object in N1 images from the plurality of images, where N1 is an integer greater than 1. The instructions configure the processor to determine, if the identified object disappears after the N1 images but reappears in less than or equal to N2 images of the plurality of images following the N1 images, that the identified object detected in the N2 images is a continued detection of the identified object detected in the N1 images.

In another feature, the instructions configure the processor to determine that the identified object is out of view of the camera if the identified object is not detected in N1+N2 images of the plurality of images.

In still other features, a system comprises a processor and a memory storing instructions which when executed by the processor configure the processor to receive images captured by first and second cameras from an image processing system, detect an object in the images using a model, and identify the detected object using the model and a database of previously identified objects. The instructions configure the processor to track movement of the identified object across the images by correlating detections of the identified object in the images.

In another feature, the instructions configure the processor to detect the identified object with increased confidence in one of the images from the first camera in response to detecting the identified object in one of the images from the second camera.

In other features, the instructions configure the processor to detect that the identified object moves across a plurality of the images from the first and second cameras in the same direction. The instructions configure the processor to track the movement of the identified object with increased confidence in response to detecting that the identified object moves across the plurality of the images from the first and second cameras in the same direction.

In another feature, the instructions configure the processor to predict subsequent detections of the object in the direction of movement with increased confidence.

In other features, the instructions configure the processor to detect when the identified object disappears from view of the first camera. The instructions configure the processor to track the movement of the identified object in a plurality of the images from the second camera in response to the identified object disappearing from view of the first camera.

In other features, the instructions configure the processor to detect when the identified object disappears from view of the second camera. The instructions configure the processor to determine first and last detections of the identified object and a direction of movement of the identified object in the images from the first and second cameras. The instructions configure the processor to determine an outcome for the identified object based on the first and last detections of the identified object and the direction of movement of the identified object.

In another feature, determining the outcome includes determining that the identified object remains in an area being observed or that the identified object has moved out the area being observed.

In other features, the instructions configure the processor to, for each instance of detection of the identified object, assign a timestamp to the detection of the identified object, assign a label to the identified object, and assign bounding box coordinates for the identified object. The instructions configure the processor to, for each instance of detection of the identified object, store the timestamp, the label, and the bounding box coordinates in a detection history for the identified object. The instructions configure the processor to determine, by correlating the detection history for the identified object, the first and last detections of the identified object and the direction of movement of the identified object.

In other features, the instructions configure the processor to, for each instance of detection of the identified object, assign a timestamp to the detection of the identified object, assign a label to the identified object, and assign bounding box coordinates for the identified object. The instructions configure the processor to, for each instance of detection of the identified object, store the timestamp, the label, and the bounding box coordinates in a detection history for the identified object. The instructions configure the processor to track the movement of the identified object across the images by correlating the detection history for the identified object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
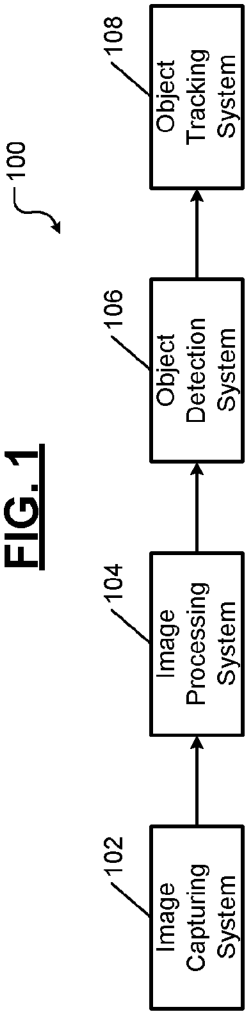
FIGS. 1 and 2 show a system for detecting objects in images and tracking movement of the objects across the images according to the present disclosure.

The present disclosure relates to detecting objects in images captured using various techniques and to tracking movement of the detected objects across a series of images. Specifically, a machine learning based model processes images to identify and locate objects captured in the images. When an object that the model is trained to recognize appears in an image input to the model, the model assigns an identifying label to the object, assigns a confidence score regarding the identifying label assigned to the object, and provides a set of coordinates for the location of the object in the image, which is used to construct a bounding box around the object in the image. The bounding boxes are used to track the object. When a series of images is processed by the model and the object is detected across multiple images in succession, the bounding boxes can be used to track the movement of the object in the series of images as explained below in detail.

When a first image including an object that the model is trained to recognize is processed by the model, the system begins tracking the identified object by initiating a tracked object structure. The tracked object structure has multiple properties including the object's label, which refers to a type of the object assigned by the model; a history of detections assigned to the object by the model; and a unique identifier assigned by the model to each instance of object detection to differentiate between individual object detections even if the detected objects are of the same type. When a tracked object is first detected, an identifying label and a new object identifier are assigned to the tracked object, and a first bounding box is stored in a detection history of the tracked object.

When a subsequent image is processed by the model and a new detection of the previously detected object (i.e., the tracked object) is made by the model, the system compares the new detection against existing tracked objects. In the new detection of the tracked object, the tracked object is assigned a higher confidence score than that assigned to the prior detection of the tracked object. If the new detection of the tracked object occurs within a predetermined range of the last recorded detection of the tracked object, the new detection is considered a continuation of that tracked object and is added to the tracked object's detection history. If multiple detections of the tracked object fall within a predetermined range for a single object, either the closest detection of the tracked object is considered a continuation of the object; or if the history of the tracked object has enough data, the history can used to determine the approximate direction of the tracked object's motion. The approximate direction can be used as a predictor to favor new detections of the tracked object in that direction.

If a tracked object is not detected within a predetermined number of images, the object is considered to be out of view (i.e., to have disappeared from view); and the tracking system is prompted to make a decision on the outcome of the object's detection or movement. Other criteria can be used to prompt the decision making depending on the use case, such as the object reaching a certain segment of the image, and so on. Once an object is considered to be out of view and the tracking system is prompted to make a decision for that object, the object's detection history and identity are used to determine an outcome for the object. Observations that can be drawn and used from the object's detection history include a point of origin (i.e., where the object was when it was first detected), the object's point of departure (i.e., where the object was when its view was lost), and the approximate direction in which the object was moving when its view was lost.

In some applications, images from multiple sources (e.g., captured by different cameras) may be processed by the model, and detections from the multiple sources can be correlated to improve object detection and object tracking. For example, images from two different sources may provide different views of the same object. If the same object is detected in the images from multiple sources, the object's identity can be assigned a higher confidence score than when the object is detected in an image from a single source. Further, object tracking can be improved using images from multiple sources. For example, the object tracking performed using images from multiple sources can confirm the direction in which the tracked object is moving. Further, while a tracked object may go out of view in images from one source, the tracked object may continue to be in view in images from another source and can therefore be tracked further. When the tracked object ultimately does go out of view, object tracking using multiple sources can provide a better outcome for the tracked object than the outcome determined based on images from a single source.

Additionally, when an item is being tracked using multiple sources, the model can use timestamps to mark when the item was first detected by a particular source and when the item was last updated by a particular source. This allows for further complexity and redundancy in the decision making process. This helps in cases, for example, where the view of the item is obstructed from one source but another source continues to observe the item.

For example, suppose an item enters the view of camera 1 and camera 2 at the beginning of the tracking process. Timestamps are taken when the item is first detected by both cameras. Subsequently, during the tracking process, an obstruction occurs such that camera 1 no longer views the item but camera 2 can view the item. The model retains a timestamp of the last time camera 1 viewed the item. The item continues to be tracked by camera 2 until it leaves the camera 2's view or otherwise triggers the decision making. While the item was lost from camera 1, the item is still being tracked by the camera 2. Accordingly, the model can wait until the item leaves the view of the last camera (i.e., camera 2 in this example). The item then leaves the observed area, and now camera 2 has also lost view of the item. The model is then prompted to make a decision on the item which was tracked.

As part of the decision making, the model compares the timestamps when the item was first detected by both cameras and when the item was last detected by both cameras to determine which camera has the earliest information on the item's origin and which camera has the latest information on where the item went. In this example, camera 1 and camera 2 detected the item at the same time but camera 1 lost track of the item before camera 2 did due to the obstruction. The model utilizes the information provided by camera 2 to determine the item's departure point and determines the outcome for the item.

The systems and methods of the present disclosure can be bundled as turnkey solutions that are customized for specific applications. Alternatively, at least some portions of the systems and methods such as the model may be implemented as Software-as-a-Service (Saas). The SaaS portion can be hosted in a cloud, interfaced with local image capturing systems, and supplied on a subscription basis. These and other features of the present disclosure are now described in further detail.

The present disclosure is organized as follows. A system for detecting objects in images and tracking movement of the objects across the images is shown and described with reference to FIGS. 1 and 2. A method for detecting objects in images and tracking movement of the objects across the images is shown and described with reference to FIG. 3. A method for detecting an object in images, tracking the object across the images, and determining a direction of movement of the object is shown and described with reference to FIG. 4A. An example of using bounding box coordinates to determine the direction of movement for the tracked object is shown and described with reference to FIG. 4B. A method for determining when a tracked object goes out of view is shown and described with reference to FIG. 5. A method for determining an outcome when a tracked object goes out of view is shown and described with reference to FIG. 6.

Subsequently, a method for detecting and tracking objects across images received from multiple sources (e.g., multiple cameras) is shown and described with reference to FIG. 7. A method for detecting and tracking an object across images received from multiple sources and determining a direction of movement of the object with increased confidence is shown and described with reference to FIG. 8. A method for detecting and tracking an object across images received from multiple cameras when the object goes out of view of one camera but subsequently appears in view of another camera is shown and described with reference to FIG. 9. A method for detecting and tracking an object across images received from two cameras when view of one camera gets obstructed while the other camera continues to view the object is shown and described with reference to FIG. 10.

FIG. 1 shows a system 100 for detecting objects in images and tracking movement of the objects across the images according to the present disclosure. The system 100 comprises an image capturing system 102, an image processing system 104, an object detection system 106, and an object tracking system 108. For example, the image capturing system 102 comprises one or more image capturing devices such as cameras. For example, the image processing system 104 processes the images captured by the image capturing system 102 by filtering noise from the images, by adjusting attributes such as color, brightness, contrast, of the images, and so on.

The object detection system 106 detects one or more objects in the processed images received from the image processing system 104 according to the present disclosure as described below in further detail. The object tracking system 108 tracks the one or more objects detected by the object detection system 106 according to the present disclosure as described below in further detail. The object detection system 106 is shown in FIG. 2 in further detail.

Each of the object detection system 106 and the object tracking system 108 comprises one more processors and memory that execute one or more methods described below with reference to FIGS. 3-10. In other words, each of the object detection system 106 and object tracking system 108 may be implemented as comprising one or more modules, which are defined below following the description of the systems and methods of the present disclosure.

In some examples, the object detection system 106 and the object tracking system 108 may be integrated into a single system (e.g., a single module). In some examples, the object detection system 106 may also perform object tracking. In some example, the object tracking system 108 may perform outcome determination after the tracked object goes out of view as explained below in detail.

Figure 2:
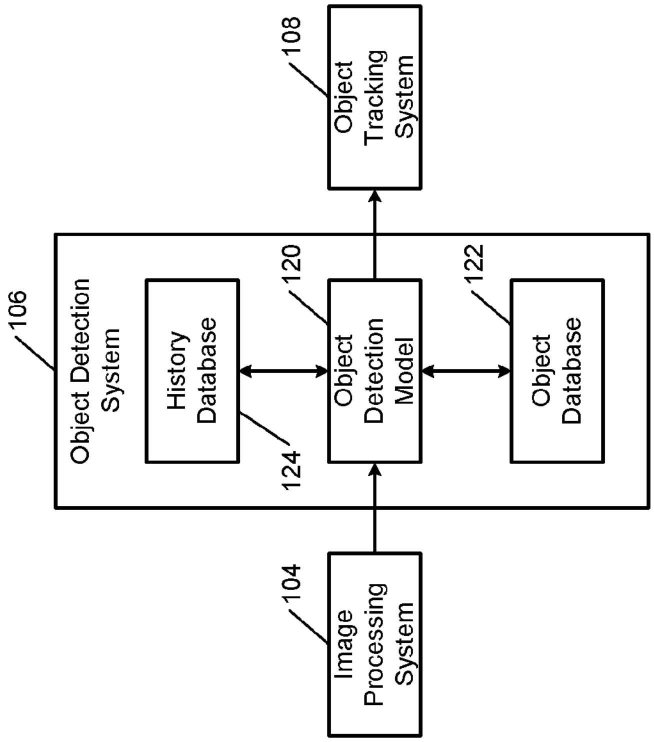

FIG. 2 shows the object detection system 106 according to the present disclosure in further detail. For example, the object detection system 106 comprises an object detection model 120, an object database 122, and a history database 124. The object detection model 120 is trained (e.g., using machine learning) to detect objects in images received from the image processing system 104. For example, the object detection model 120 is trained to identify an object based on one or more views of the object captured by one or more cameras of the image capturing system 102. The views (i.e., images) captured from different angles by the one or more cameras are stored in the object database 122 after processing by the image processing system 104. The object database 122 stores numerous views of a variety of objects that the object detection model 120 is trained to detect.

In use, the object detection model 120 detects an object in an image received from the image processing system 104 using the methods described below in detail. When an object is detected, the object detection model 120 compares the detected object to one or more objects stored in the object database 122. If an object that matches the detected object is found in the object database 122, the object detection model 120 assigns various parameters to the detected object. The parameters include an identifying label for the detected object, a confidence score for the assigned identifying label, an identifier for the instance of detection of the object, and bounding box coordinates for the detected object, which indicate a location of the detected object in the image. These parameters along with a timestamp for the instance of detection of the object are stored in a detection history of the detected object in the history database 124. The object detection model 120 uses the detection history to track the detected object and to determine the direction of movement of the tracked object using the methods described below in detail.

As mentioned above, the system 100 can be supplied as a turnkey solution that is customized for a specific application (e.g., for a retail or medical application). Alternatively, at least one of the image processing system 104, the object detection system 106, the object tracking system 108 may be implemented in a cloud as Software-as-a-Service (SaaS), interfaced with a locally deployed image capturing system 102, and supplied on a subscription basis.

Figure 3:
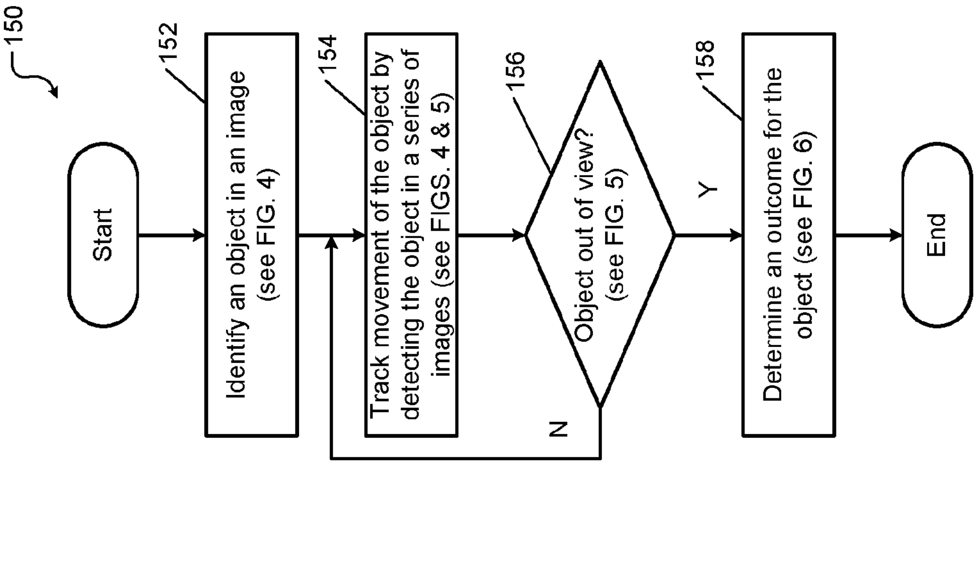
FIG. 3 shows a method for detecting objects in images and tracking movement of the objects across the images according to the present disclosure.

FIG. 3 shows a method 150 for detecting objects in images and tracking movement of the objects across the images according to the present disclosure. The method 150 is shown and described generally with reference to FIG. 3 and more particularly (i.e., in detail) with reference to FIGS. 4-6. The method 150 is performed partly by the object detection model 120 of the object detection system 106 and partly by the object tracking system 108.

At 152, the object detection model 120 identifies an object in an image received from the image processing system 104. The object detection is described below in further detail with reference to FIG. 4. At 154, the object detection model 120 tracks the movement of the object by detecting the object in a series of images received from the image processing system 104. The object detection model 120 maintains a history of the detections of the tracked object in the history database 124. The object tracking is described below in further detail with reference to FIGS. 4 and 5.

At 156, the object tracking system 108 determines if the tracked object is out of view as explained below with reference to FIG. 5. If the tracked object is not out of view, the method 150 returns to 154 (i.e., the object detection model 120 continues to track the object). If the tracked object is out of view, at 158, the object tracking system 108 determines an outcome for the tracked object (e.g., what happened to the tracked object) as explained below in detail with reference to FIG. 6.

Figure 4A:
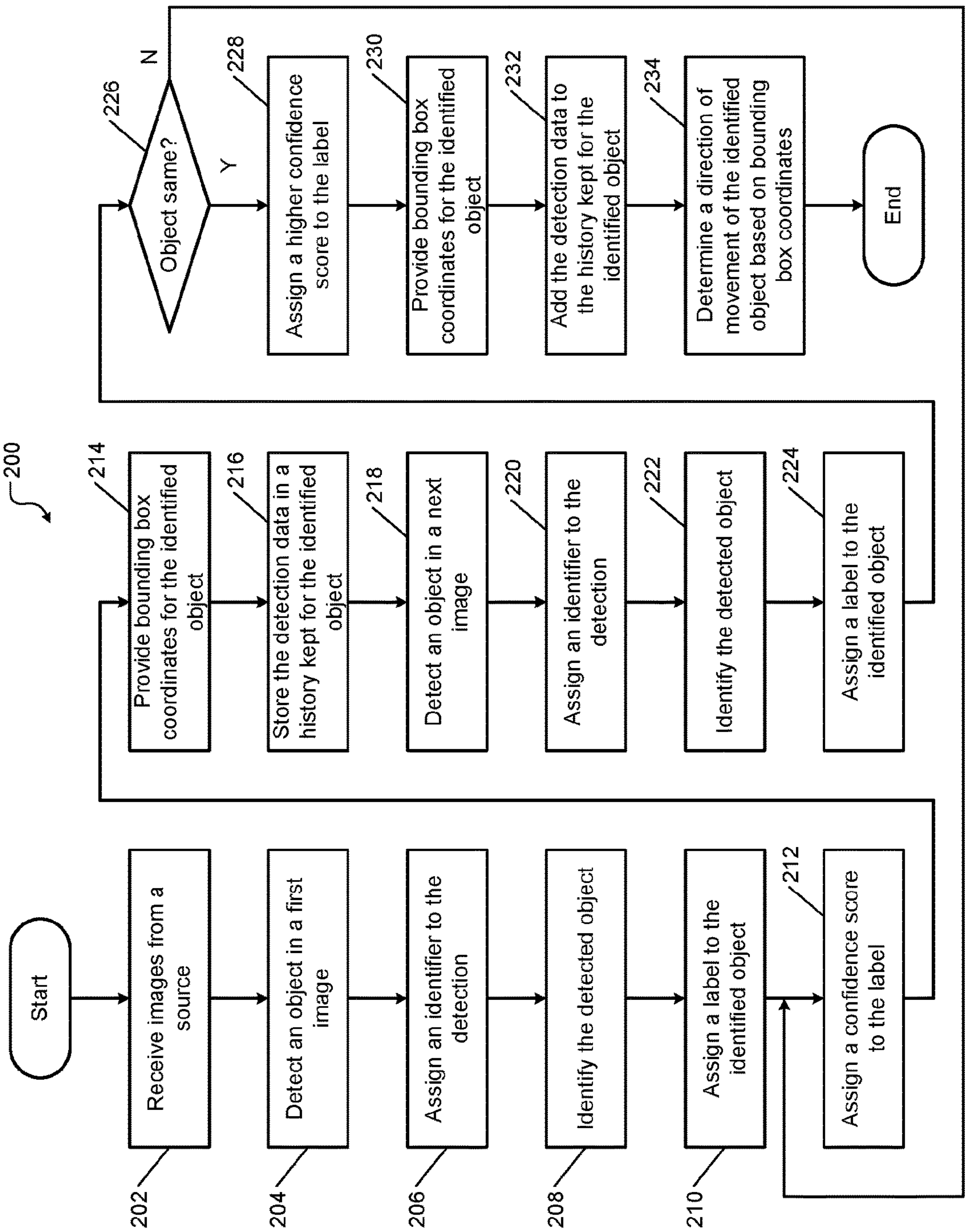
FIG. 4A shows a method for detecting an object in images, tracking the object across the images, and determining a direction of movement of the object according to the present disclosure.

FIG. 4A shows a method 200 for detecting an object in images, tracking the object across the images, and determining a direction of movement of the object according to the present disclosure in further detail. At 202, the object detection model 120 receives images from a source. At 204, the object detection model 120 detects an object in a first image. At 206, the object detection model 120 assigns an identifier to the detection. At 208, the object detection model 120 identifies the detected object using the object database 122 (i.e., by comparing the detected object to the objects in the object database 122). At 210, the object detection model 120 assigns a label to the identified object. At 212, the object detection model 120 assigns a confidence score to the label assigned to the identified object. At 214, the object detection model 120 provides bounding box coordinates for the identified object (shown in detail with reference to FIG. 4B). At 216, object detection model 120 stores the detection data (i.e., the identifier, the label, the confidence score, and the bounding box coordinates) in a history maintained for the identified object in the history database 124.

At 218, the object detection model 120 detects an object in a next image. At 220, the object detection model 120 assigns an identifier to the detection. At 222, the object detection model 120 identifies the detected object using the object database 122. At 224, the object detection model 120 assigns a label to the identified object (i.e., by comparing the detected object to the objects in the object database 122). At 226, the object detection model 120 determines if the object identified in the next image is the same object that was identified in the previous image. The method 200 returns to 212 if the object identified in the next image is not the same object that was identified in the previous image.

If the object identified in the next image is the same object that was identified in the previous image, at 228, the object detection model 120 assigns a higher confidence score to the label assigned to the identified object in the next image. At 230, object detection model 120 provides bounding box coordinates for the identified object in the next image (shown in detail with reference to FIG. 4B). At 232, object detection model 120 adds the detection data (i.e., the identifier, the label, the confidence score, and the bounding box coordinates) in the history maintained for the identified object in the history database 124.

At 234, the object tracking system 108 determines a direction of movement for the identified object based on the bounding box coordinates stored in the history for the identified object. For example, the object tracking system 108 determines the direction of movement for the tracked object by subtracting the bounding box coordinates at the instance of the first detection of the tracked object from the bounding box coordinates at the instance of the last detection of the tracked object.

Figure 4B:
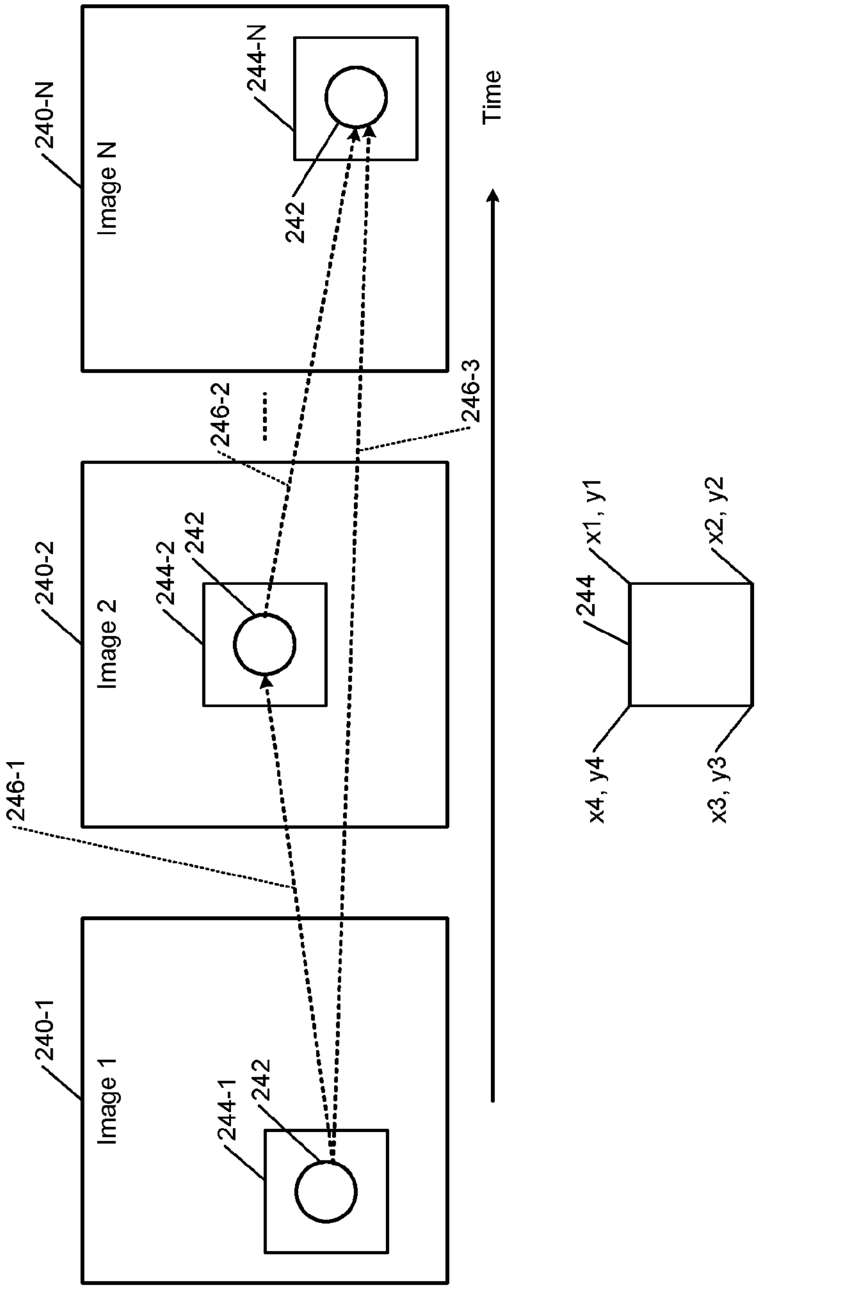
FIG. 4B shows an example of using bounding box coordinates to determine the direction of movement for the tracked object.

FIG. 4B shows an example of using bounding box coordinates to determine the direction of movement for the tracked object. In the example shown, an object 242 is tracked in a series of images 240-1, 240-2, . . . , and 240-N (collectively the images 240), where N is a positive integer. In each image 240, when the object 242 is detected and identified as explained above, a bonding box 244 is assigned to the object 242. Each bounding box 244 has coordinates (x1, y1), (x2, y2), (x3, y3), and (x4, y4). The direction of movement of the object 242 can be calculated between any two images 240-*i* and 240-*j* can be calculated by subtracting the coordinates of the bounding box 244-*j* from the coordinates of the bounding box 244-*i*.

For example, the direction of movement 246-1 of the object 242 between the images 240-1 and 240-2 is the difference between the coordinates of the bounding boxes 244-2 and 244-1. The direction of movement 246-2 of the object 242 between the images 240-2 and 240-N is the difference between the coordinates of the bounding boxes 244-N and 244-2. If the object 242 is first detected in the image 240-1 and is last detected in the image 240-N, the net direction of movement 246-3 of the object 242 between the images 240-1 and 240-N is the difference between the coordinates of the bounding boxes 244-N and 244-1.

Figure 5:
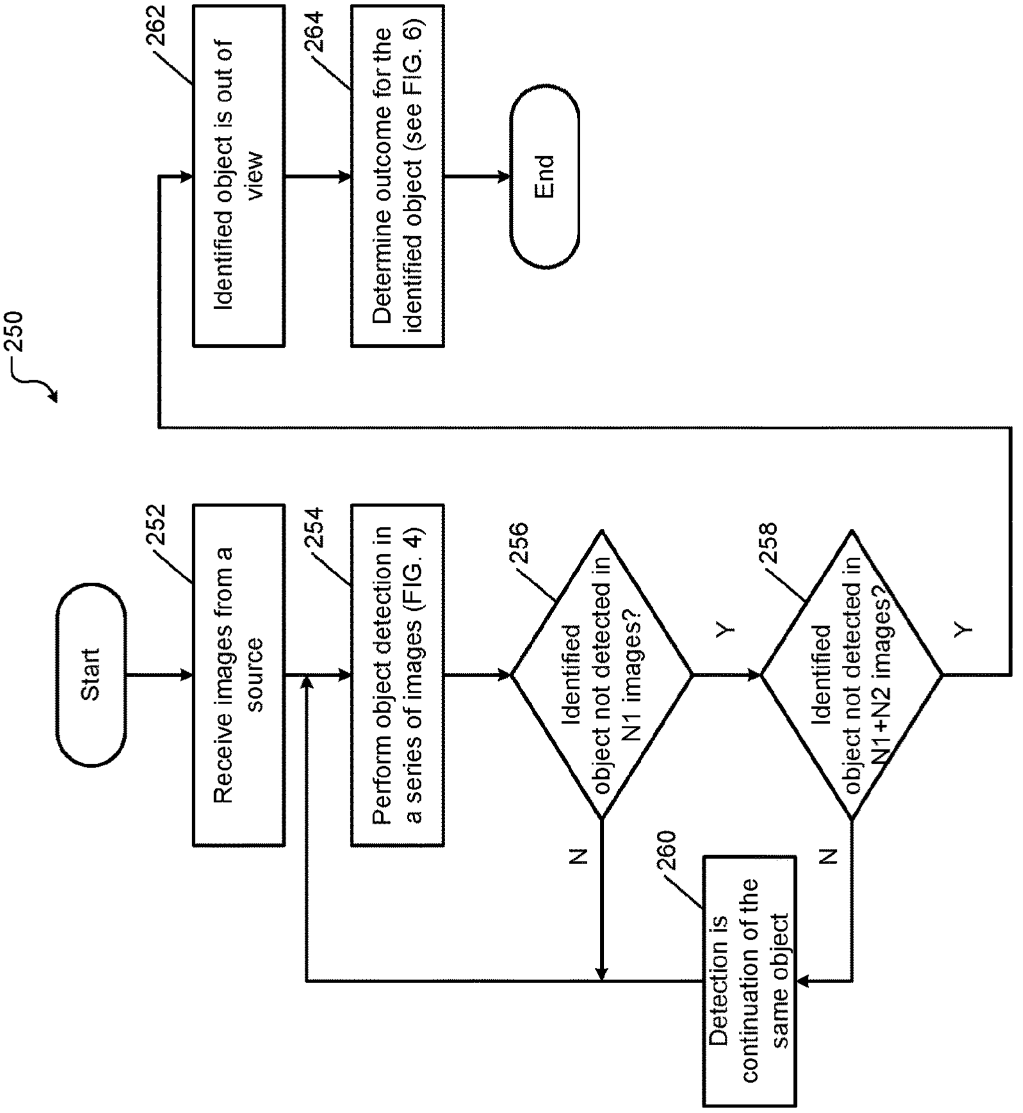
FIG. 5 shows a method for determining when a tracked object goes out of view according to the present disclosure.

FIG. 5 shows a method 250 for determining when a tracked object goes out of view according to the present disclosure. At 252, the object detection model 120 receives images from a source. At 254, the object detection model 120 performs object detection in a series of images as explained above with reference to FIG. 4. At 256, the object detection model 120 determines if the identified object was not detected in N1 consecutive images, where N1 is a positive integer. The method 250 returns to 254, and object detection model 120 continues to perform object detection if the identified object continues to be detected.

If the identified object was not detected in N1 consecutive images, at 258, the object detection model 120 determines if the identified object was not detected in additional N2 consecutive images subsequent to the N1 images (i.e., if the identified object was not detected in N1+N2 consecutive images), where N2 is a positive integer. If the identified object was detected in the additional N2 consecutive images (i.e., if the identified object was not detected in the N1 images but was detected in N2 images following the N1 images), at 260, the object detection model 120 determines that the detection is a continuation of the same object (i.e., the identified object is the same object) that was identified in images prior to the N1 images, the method 250 returns to 254, and the object detection model 120 continues to perform object detection.

If the identified object was not detected in additional N2 consecutive images subsequent to the N1 images (i.e., if the identified object was not detected in N1+N2 consecutive images), at 262, the object detection model 120 determines that the identified object is out of view. At 264, the object tracking system 108 determines an outcome for the tracked object (e.g., what happened to the tracked object) as explained below in detail with reference to FIG. 6.

Figure 6:
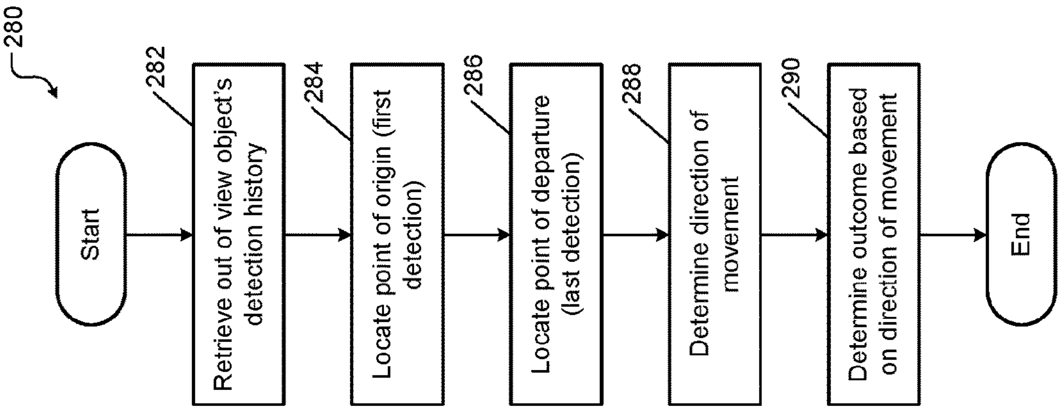
FIG. 6 shows a method for determining an outcome when a tracked object goes out of view according to the present disclosure.

FIG. 6 shows a method 280 for determining an outcome when a tracked object goes out of view according to the present disclosure. At 282, the object tracking system 108 retrieves the detection data stored in a history for the tracked object in the history database 124. At 284, the object tracking system 108 locates a point of origin (i.e., the instance of the first detection) of the tracked object (e.g., based on the bounding box coordinates provided by the object detection model 120 at the instance of the first detection of the tracked object). At 286, the object tracking system 108 locates a point of departure (i.e., the instance of the last detection) of the tracked object (e.g., based on the bounding box coordinates provided by the object detection model 120 at the instance of the last detection of the tracked object).

At 288, the object tracking system 108 determines a direction of movement for the tracked object based on the point of origin and the point of departure determined for the tracked object. For example, the object tracking system 108 determines the direction of movement for the tracked object by subtracting the bounding box coordinates at the instance of the first detection of the tracked object from the bounding box coordinates at the instance of the last detection of the tracked object.

At 290, the object tracking system 108 determines an outcome for the tracked object (i.e., what happened to the tracked object when the tracked object went out of view) based on the determined direction of movement of the tracked object. For example, the object tracking system 108 determines if the tracked object went into an area or out of an area under observation. For example, the observed area can be a storage shelf (e.g., of a cabinet, refrigerator, etc.) being monitored, and the tracked object can be a food item (e.g., a milk carton). For example, the observed area can be a surgical region (e.g., abdomen) being monitored, and the tracked object can be a surgical instrument (e.g., a scalpel). For example, the observed area can be a region in outer space being monitored, and the tracked object can be a celestial body (e.g., a star, a planet, etc.); and so on.

Figure 7:
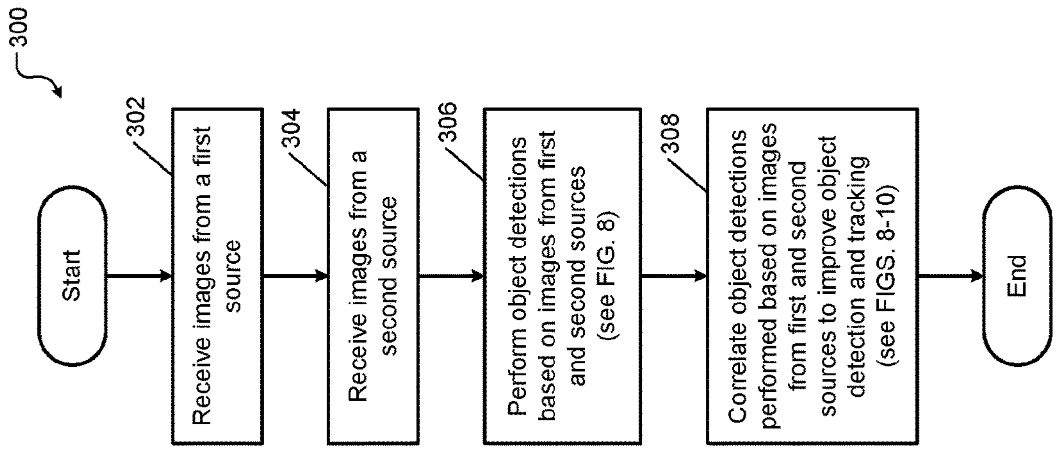
FIG. 7 shows a method for detecting and tracking objects across images received from multiple sources (e.g., multiple cameras) according to the present disclosure.

FIG. 7 shows a method 300 for detecting and tracking objects across images received from multiple sources (e.g., multiple cameras) according to the present disclosure. At 302, the object detection model 120 receives images from a first source (e.g., images captured by a first camera of the image capturing system 102 and processed by the image processing system 104). At 304, the object detection model 120 receives images from a second source (e.g., images captured by a second camera of the image capturing system 102 and processed by the image processing system 104). At 306, the image detection model 120 performs object detections based on the images received from the first and second sources as described below in greater detail with reference to FIG. 8. At 308, the image detection model 120 correlates the object detections performed based on the images received from the first and second sources to improve object detection and tracking as described below in greater detail with reference to FIGS. 8-10.

Figure 8:
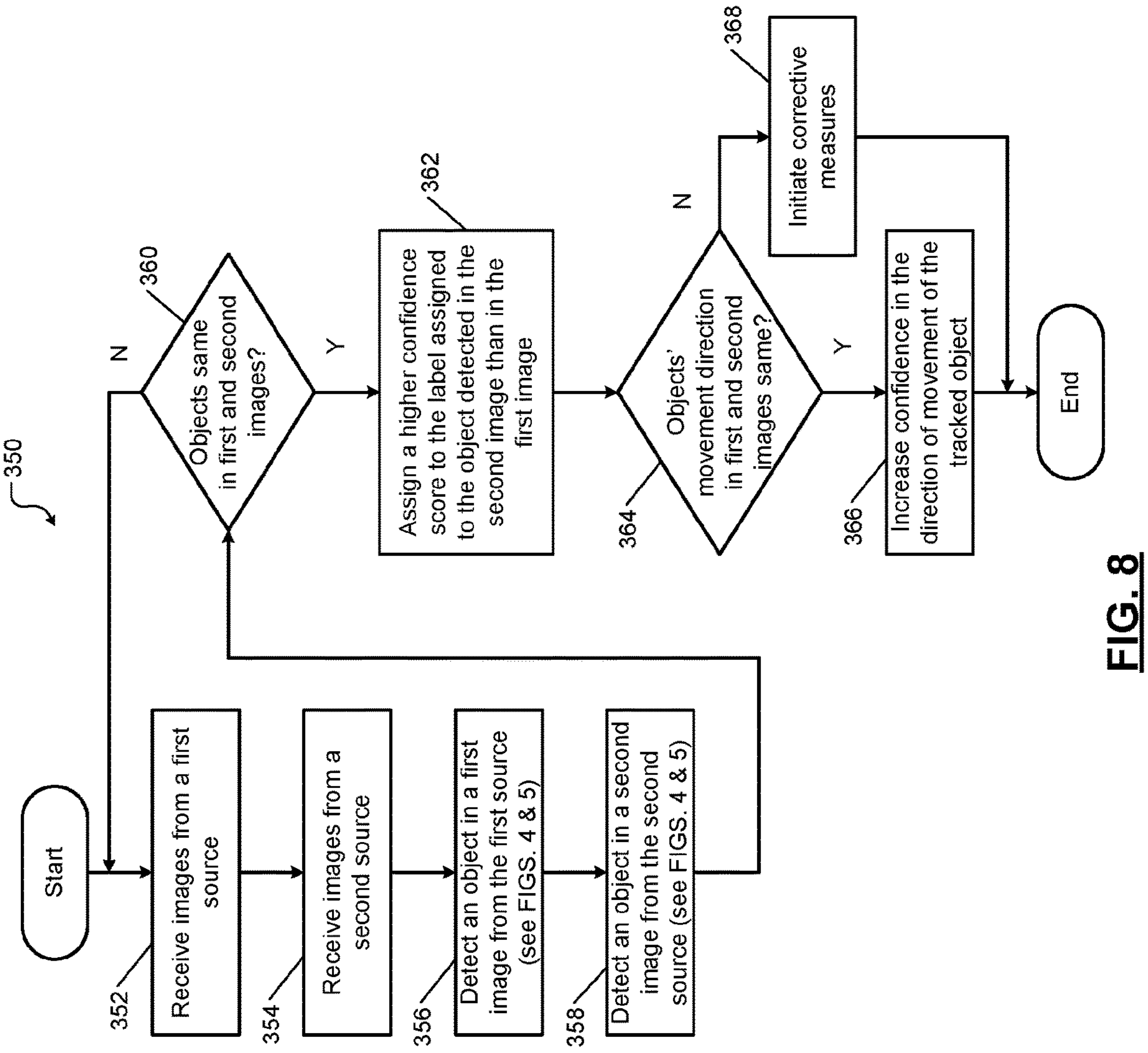
FIG. 8 shows a method for detecting and tracking an object across images received from multiple sources and determining a direction of movement of the object with increased confidence according to the present disclosure.

FIG. 8 shows a method 350 for detecting and tracking an object across images received from multiple sources and determining a direction of movement of the object with increased confidence according to the present disclosure. At 352, the object detection model 120 receives images from a first source (e.g., images captured by a first camera of the image capturing system 102 and processed by the image processing system 104). At 354, the object detection model 120 receives images from a second source (e.g., images captured by a second camera of the image capturing system 102 and processed by the image processing system 104).

At 356, the object detection model 120 detects an object in a first image received from the first source as described above with reference to FIGS. 4 and 5. At 358, the object detection model 120 detects an object in a second image received from the second source as described above with reference to FIGS. 4 and 5. At 360, the object detection model 120 determines if the objects detected in the first and second images are the same object. The method 350 returns to 352 if the objects detected in the first and second images are not the same object, and the object detection model 120 continues to detect objects in the images received from the first and second sources as described above with reference to FIGS. 4 and 5. If the objects detected in the first and second images are the same object, the object detection model 120 assigns a higher confidence score to the label assigned to the object detected in the second image than the confidence score assigned to the label assigned to the object detected earlier in the first image.

At 364, the object detection model 120 determines the direction of movement of the objects detected in the first and second images as described above with reference to FIG. 6. The object detection model 120 determines if the direction of movement of the objects detected in the first and second images is the same. If the direction of movement of the objects detected in the first and second images is the same, at 366, the object detection model 120 indicates an increased confidence in the direction of movement of the object detected in the first and second images, and the method 350 ends. Additionally, the object detection model 120 uses the direction to predict subsequent detections of the object in that direction with increased confidence. That is, the object detection model 120 can use the direction as a predictor to favor new detections of the tracked object in that direction.

If the direction of movement of the objects detected in the first and second images is not the same, at 368, the object detection model 120 suggests or initiates corrective measures, and the method 350 ends. For example, the corrective measures may include generating an alert that the same object viewed by two cameras is moving in divergent directions, which may indicate a problem in the system 100 (e.g., one or more elements of the system 100 may need to be updated).

Figure 9:
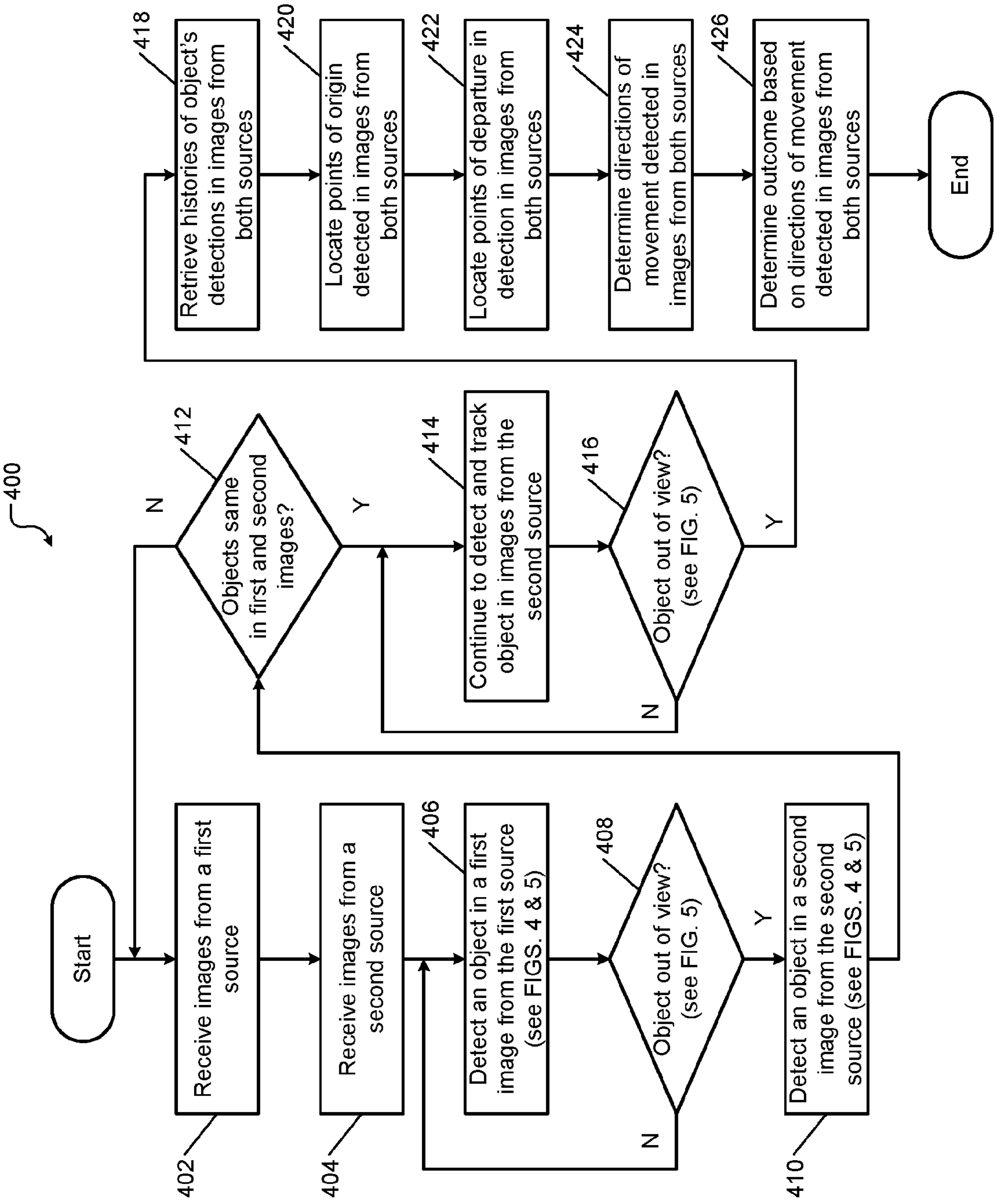
FIG. 9 shows a method for detecting and tracking an object across images received from multiple cameras when the object goes out of view of one camera but subsequently appears in view of another camera according to the present disclosure.

FIG. 9 shows a method 400 for detecting and tracking an object across images received from multiple cameras when the object goes out of view of one camera but subsequently appears in view of another camera according to the present disclosure. At 402, the object detection model 120 receives images from a first source (e.g., images captured by a first camera of the image capturing system 102 and processed by the image processing system 104). At 404, the object detection model 120 receives images from a second source (e.g., images captured by a second camera of the image capturing system 102 and processed by the image processing system 104). At 406, the object detection model 120 detects an object in a first image received from the first source as described above with reference to FIGS. 4 and 5.

At 408, the object detection model 120 determines if the object has gone out of view from the images received from the first source as described above with reference to FIG. 5. If the object has not gone out of view, the method 400 returns to 406, and the object detection model 120 continues to detect and track the object based on the images received from the first source.

If the object has gone out of view from the images received from the first source, at 410, the object detection model 120 detects an object in a second image received from the second source as described above with reference to FIGS. 4 and 5. At 412, the object detection model 120 determines if the objects detected in the first and second images from the first and second sources are the same object. The method 400 returns to 402 if the objects detected in the first and second images are not the same object, and the object detection model 120 continues to detect objects in the images received from the first and second sources as described above with reference to FIGS. 4 and 5. If the objects detected in the first and second images are the same object, at 414, the object detection model 120 continues to detect and track the object in the images received from the second source as described above with reference to FIGS. 4 and 5.

At 416, the object detection model 120 determines if the object has gone out of view from the images received from the second source as described above with reference to FIG. 5. If the object has not gone out of view, the method 400 returns to 414, and the object detection model 120 continues to detect and track the object based on the images received from the second source. If the object has gone out of view from the images received from the second source, at 418, the object tracking system 108 retrieves from the history database 124 the histories of object's detections in the images received from both first and second sources.

At 420, the object tracking system 108 locates points of origin (i.e., the instances of the first detections in the images received from the first and second sources) of the tracked object. For example, the object tracking system 108 locates the points of origin based on the bounding box coordinates provided by the object detection model 120 at the instances of the first detections of the tracked object in the images received from the first and second sources.

At 422, the object tracking system 108 locates points of departure (i.e., the instance of the last detections in the images received from the first and second sources) of the tracked object. For example, the object tracking system 108 locates the points of departure based on the bounding box coordinates provided by the object detection model 120 at the instances of the last detections of the tracked object in the images received from the first and second sources.

At 424, the object tracking system 108 determines directions of movement for the tracked object based on the points of origin and the points of departure determined for the tracked object. At 426, the object tracking system 108 determines an outcome for the tracked object (i.e., what happened to the tracked object when the tracked object went out of view) based on the determined directions of movement of the tracked object. For example, the object tracking system 108 determines if the tracked object went into an area or out of an area being observed by the first and second sources, examples of which are provided above with reference to FIG. 6 and are therefore not repeated for brevity.

Figure 10:
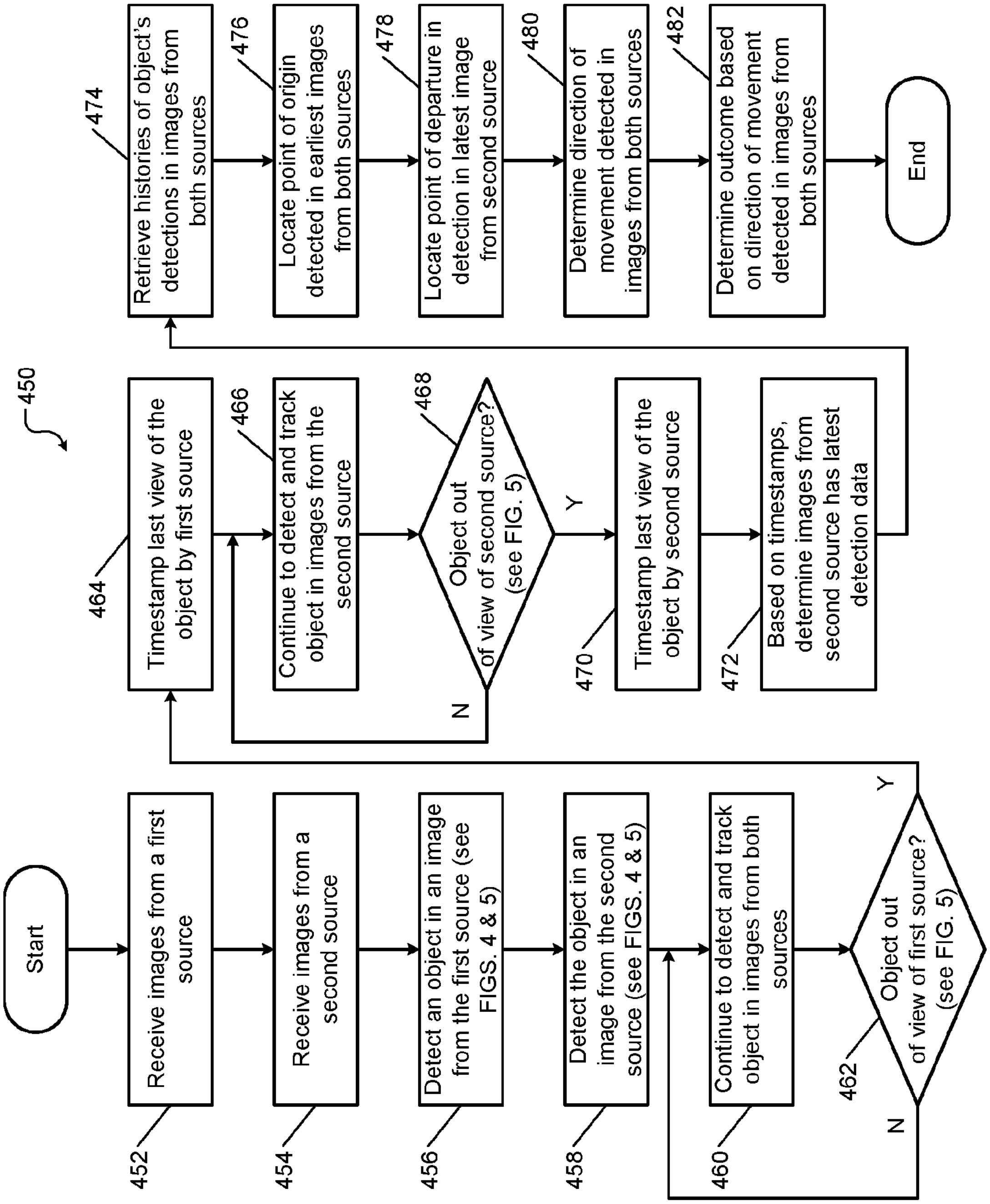
FIG. 10 shows a method for detecting and tracking an object across images received from two cameras when view of one camera gets obstructed while the other camera continues to view the object according to the present disclosure.

FIG. 10 shows a method 450 for detecting and tracking an object across images received from two cameras when view of one camera gets obstructed while the other camera continues to view the object according to the present disclosure. At 452, the object detection model 120 receives images from a first source (e.g., images captured by a first camera of the image capturing system 102 and processed by the image processing system 104). At 454, the object detection model 120 receives images from a second source (e.g., images captured by a second camera of the image capturing system 102 and processed by the image processing system 104).

At 456, the object detection model 120 detects an object in a first image received from the first source as described above with reference to FIGS. 4 and 5. The object detection model 120 timestamps the first view of the object by the first source (i.e., the object detection model 120 timestamps the first instance of detection of the object based on the images received from the first source). The timestamped detection data is stored in a detection history of the tracked object in the history database 124.

At 458, the object detection model 120 detects the same object in a second image received from the second source as described above with reference to FIGS. 4 and 5. The object detection model 120 timestamps the first view of the object by the second source (i.e., the object detection model 120 timestamps the first instance of detection of the object based on the images received from the second source). The time-stamped detection data is stored in the detection history of the tracked object in the history database 124.

At 460, the object detection model 120 continues to detect and track the object in the images received from the first and second sources as described above with reference to FIGS. 4 and 5. At 462, the object detection model 120 determines if the object has gone out of view from the images received from the first source as described above with reference to FIG. 5. If the object has not gone out of view, the method 450 returns to 460, and the object detection model 120 continues to detect and track the object based on the images received from the first and second sources as described above with reference to FIGS. 4 and 5.

If the object has gone out of view from the images received from the first source, at 464, the object detection model 120 timestamps the last view of the object by the first source (i.e., the object detection model 120 timestamps the last instance of detection of the object based on the images received from the first source). The timestamped detection data is stored in the detection history of the tracked object in the history database 124. At 466, the object detection model 120 continues to detect and track the object based on the images received from the second source as described above with reference to FIGS. 4 and 5.

At 468, the object detection model 120 determines if the object has gone out of view from the images received from the second source as described above with reference to FIG. 5. The method 450 returns to 466 if the object has not gone out of view from the images received from the second source, and the object detection model 120 continues to detect and track the object based on the images received from the second source as described above with reference to FIGS. 4 and 5. If the object has gone out of view from the images received from the second source, at 470, the object detection model 120 timestamps the last view of the object by the second source (i.e., the object detection model 120 timestamps the last instance of detection of the object based on the images received from the second source). The time-stamped detection data is stored in the detection history of the tracked object in the history database 124.

At 472, based on the timestamped detection data stored in the detection history of the tracked object in the history database 124, the object tracking system 108 determines that the detection data for the object obtained from the images from the second source is later in time than the detection data for the object obtained from the images from the first source. That is, the object tracking system 108 determines the detection data for the object obtained from the images from the second source is the latest detection data for the object. Specifically, the object tracking system 108 compares the timestamps when the object was first detected in images from both sources and when the object was last detected in images from both sources. Based on the comparison, the object tracking system 108 determines the detection data from which source has the earliest information on the object's origin (the first source in this example) and the detection data which source has the latest information on where the object went (the second source in this example).

At 474, the object tracking system 108 retrieves from the history database 124 the histories of detections of the tracked object in the images received from both first and second sources. At 476, the object tracking system 108 locates a point of origin (i.e., an instance of first detection of the tracked object in the images received from the first and second sources) of the tracked object. For example, the object tracking system 108 locates the point of origin based on the timestamps provided by the object detection model 120 at the instances of the first detections of the tracked object in the images received from the first and second sources.

At 422, the object tracking system 108 locates a point of departure (i.e., the instance of the last detection in the images received from the second source) of the tracked object. For example, the object tracking system 108 locates the point of departure based on the timestamp provided by the object detection model 120 at the instance of the last detection of the tracked object in the images received from the second source, which is determined as the latest detection data for the tracked object as explained above.

At 480, the object tracking system 108 determines the direction of movement for the tracked object based on the point of origin and the point of departure determined for the tracked object. At 482, the object tracking system 108 determines an outcome for the tracked object (i.e., what happened to the tracked object when the tracked object went out of view) based on the determined direction of movement of the tracked object. For example, the object tracking system 108 determines if the tracked object went into an area or out of an area under observation, examples of which are provided above with reference to FIG. 6 and are therefore not repeated for brevity.

An illustrative example of detecting and tracking an object using the above systems and methods is provided. Suppose that the system 100 is set up to monitor items added and removed from a fridge and that the object detection model 120 is trained to recognize food items. The system 100 is informed that one side of the image is the fridge door and all other sides are away from the fridge. An image is passed to the object detection model 120. The object detection model 120 recognizes an item in the image as milk and begins tracking the object with the first detection passed into its history. The first detection puts the coordinates of the bounding box away from the fridge. Several more images are processed. Each processed image indicates that the direction in which the milk appears to move is towards the fridge until the item is considered out of view. The system 100 is then prompted to make a decision on what happened to the item. The first detection in the object's detection history was away from the fridge, and the last detection before the item went out of view was very close to the fridge side of the image. Using a few of the last detections, the system 100 determines that the milk was still moving towards the fridge when the view was lost. With all these factors, the system 100 determines that a new milk item has been added to the fridge.

The systems and methods can be used to maintain an inventory of objects used in a surgical procedure. The inventory at the end of the surgical procedure must match the inventory at the beginning of the surgical procedure. If the two inventories do not match, the system 100 can issue an alert that one or more objects or instruments used in the surgical procedure are unaccounted for. The system and methods can be used to manage inventories in refrigerators and cabinets in households. The system and methods can be used to manage inventories in stores, vending machines, and so on. Many other uses are contemplated.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another are within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:

a processor; and a memory storing instructions which when executed by the processor configure the processor to:

receive a plurality of images captured by a camera from an image processing system;

detect an object in an image from the plurality of images using an object detection model that is trained using machine learning;

identify the detected object using the object detection model and a database of previously identified objects;

track movement of the identified object across a series of images from the plurality of images;

detect, based on the plurality of images, when the identified object disappears from view of the camera, wherein, to detect when the identified object disappears from view of the camera, the instructions configure the processor to:

determine whether the identified object is not detected in N1 consecutive images from the plurality of images, where N1 is an integer greater than 1;

determine, if the identified object is detected within N2 consecutive images of the plurality of images following the N1 consecutive images, that the detection is a continued detection of the identified object that was identified in images prior to the N1 consecutive images, where N2 is a positive integer; and determine that the identified object is out of view of the camera if the identified object is not detected in N1+N2 consecutive images of the plurality of images; and determine an outcome for the identified object based on first and last detections of the identified object and a direction of movement of the identified object.

2. The system of claim 1 wherein the instructions configure the processor to, for each instance of detection of the identified object:

assign an identifying label to the identified object;

assign a confidence score for the identifying label; and increase the confidence score with each successive detection of the identified object.

3. The system of claim 1 wherein the instructions configure the processor to predict subsequent detections of the object in the direction of movement with increased confidence.

4. A system comprising:

a processor; and a memory storing instructions which when executed by the processor configure the processor to:

receive images captured by first and second cameras from an image processing system;

detect an object in the images using an object detection model that is trained using machine learning;

identify the detected object using the object detection model and a database of previously identified objects;

store detection data for detections of the identified object in a detection history for the identified object in the memory;

detect the identified object with increased confidence in one of the images from the first camera in response to detecting the identified object moving across a plurality of the images from the first and second cameras in a same direction; and track movement of the identified object across the images with increased confidence in response to detecting that the identified object moves across the plurality of the images from the first and second cameras in the same direction by correlating detections of the identified object in the images using the detection history, wherein the tracking comprises:

after determining that the identified object has gone out of view from images captured by the first camera due to an obstruction while the identified object remains in view in images captured by the second camera, continuing to detect and track the identified object using the images captured by the second camera;

in response to subsequently determining that the identified object has gone out of view from the images captured by the second camera, determining, from the continuing detection and tracking by the second camera after the identified object went out of view from the images captured by the first camera, that detection data obtained from the images captured by the second camera includes latest detection data for the identified object;

determining, based on the latest detection data and the detection history, the direction of movement of the identified object; and determining, based on the direction of movement, whether the identified object remains in or has moved out of an area being observed.

5. The system of claim 4 wherein the instructions configure the processor to detect the identified object with increased confidence in one of the images from the first camera in response to detecting the identified object in one of the images from the second camera.

6. The system of claim 4 wherein the instructions configure the processor to:

detect that the identified object moves across a plurality of the images from the first and second cameras in the same direction; and track the movement of the identified object with increased confidence in response to detecting that the identified object moves across the plurality of the images from the first and second cameras in the same direction.

7. The system of claim 6 wherein the instructions configure the processor to predict subsequent detections of the object in the direction of movement with increased confidence.

8. The system of claim 4 wherein the instructions configure the processor to:

detect when the identified object disappears from view of the first camera; and track the movement of the identified object in a plurality of the images from the second camera in response to the identified object disappearing from view of the first camera.

9. The system of claim 8 wherein the instructions configure the processor to:

detect when the identified object disappears from view of the second camera;

determine first and last detections of the identified object and a direction of movement of the identified object in the images from the first and second cameras; and determine an outcome for the identified object based on the first and last detections of the identified object and the direction of movement of the identified object.

10. The system of claim 9 wherein determining the outcome includes determining that the identified object remains in an area being observed or that the identified object has moved out the area being observed.

11. The system of claim 9 wherein the instructions configure the processor to:

for each instance of detection of the identified object:

store detection data for the instance of detection in a detection history for the identified object; and determine, by correlating the detection history for the identified object, the first and last detections of the identified object and the direction of movement of the identified object.

* * * * *